(12) United States Patent
Korenev (10) Patent No.: US 8,679,209 B2
(45) Date of Patent: Mar. 25, 2014

(54) PULSED PLASMA REGENERATION OF A PARTICULATE FILTER

(75) Inventor: Sergey Korenev, Mundelein, IL (US)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 13/330,872

(22) Filed: Dec. 20, 2011

(65) Prior Publication Data
US 2013/0152518 A1 Jun. 20, 2013

(51) Int. Cl.
B01D 50/00 (2006.01)
B01D 39/14 (2006.01)
B01D 39/06 (2006.01)
B01D 24/00 (2006.01)

(52) U.S. Cl.
USPC ............. 55/282.3; 55/522; 55/523; 55/524; 422/169; 422/170; 422/171; 422/172; 422/177; 422/178; 422/179; 422/180; 422/181; 422/182

(58) Field of Classification Search
USPC .................. 55/282.2, 522–524, 282.3; 422/169–172, 177–182
See application file for complete search history.

(56) References Cited

U.S. PATENT DOCUMENTS

| | | | |
|---|---|---|---|
| 5,348,571 A * | 9/1994 | Weber | 96/68 |
| 5,804,149 A * | 9/1998 | Ota et al. | 422/174 |
| 6,959,542 B2 * | 11/2005 | Taylor et al. | 60/295 |
| 7,716,922 B2 | 5/2010 | Ehlers | |
| 7,946,111 B2 | 5/2011 | Kakinohana et al. | |
| 2004/0128985 A1 * | 7/2004 | Shimasaki et al. | 60/286 |
| 2004/0144069 A1 * | 7/2004 | Gabe et al. | 55/282.3 |
| 2006/0065121 A1 | 3/2006 | Crawley et al. | |
| 2007/0137150 A1 * | 6/2007 | Goddard | 55/282 |
| 2008/0006155 A1 * | 1/2008 | Sellers et al. | 95/282 |
| 2008/0034737 A1 * | 2/2008 | Otsubo et al. | 60/292 |
| 2008/0072574 A1 | 3/2008 | Masuda et al. | |
| 2008/0127637 A1 | 6/2008 | Henderson | |
| 2008/0190296 A1 * | 8/2008 | Alam | 96/83 |
| 2009/0000477 A1 | 1/2009 | Meister et al. | |
| 2009/0282817 A1 | 11/2009 | Masuda et al. | |
| 2010/0154632 A1 * | 6/2010 | Garner et al. | 95/69 |
| 2012/0227683 A1 * | 9/2012 | Scott et al. | 123/3 |

FOREIGN PATENT DOCUMENTS

| | | |
|---|---|---|
| DE | 4103653 | 6/1992 |
| EP | 1632654 A1 | 3/2006 |
| JP | 59127621 | 7/1984 |
| JP | 2004332608 | 11/2004 |
| WO | WO 94/07008 | 3/1994 |
| WO | WO 2010/037406 | 4/2010 |

OTHER PUBLICATIONS

U.S. Appl. No. 13/174,373, filed Jun. 30, 2011.
U.S. Appl. No. 12/219,810, filed Jul. 29, 2008.

* cited by examiner

Primary Examiner — Amber Orlando
(74) Attorney, Agent, or Firm — Finnegan, Henderson, Farabow, Garrett & Dunner LLP (57) ABSTRACT

A method for removing matter from a filter is disclosed. The method may include measuring loading conditions of a filter media. The method may also include applying at least one voltage pulse between an electrode external to the filter media and a housing of the filter media to induce a plurality of shock waves directed toward the filter media, based on the loading conditions.

20 Claims, 2 Drawing Sheets

PULSED PLASMA REGENERATION OF A PARTICULATE FILTER

TECHNICAL FIELD

The present disclosure is directed to a filter regeneration method and system, and more particularly, to a method and system that utilizes pulsed plasma to regenerate a particulate filter.

BACKGROUND

Engines, including diesel engines, gasoline engines, natural gas engines, and other engines known in the art, exhaust a complex mixture of pollutants. The pollutants are composed of gaseous and solid material, including particulate matter and sulfur compounds.

Due to heightened environmental concerns, engine exhaust emission standards have become increasingly stringent over the years, and the amount of pollutants emitted from an engine may be regulated depending on the type, size, and/or class of engine. One method that has been implemented by engine manufacturers to comply with the regulation of particulate matter and sulfur compounds exhausted to the environment has been to remove these pollutants from the exhaust flow of an engine with filters. But, extended use of such filters can cause the pollutants to build up in components of the filters, thereby causing filter functionality and engine performance to decrease. One way to extend usage of the filters is to regenerate the filters through application of elevated temperatures. Regenerating filters through conventional methods, however, may take up to eight hours or longer, depending on, for example, the size of the filter, the configuration and material composition of filter media, and the type of heat source used. Such a long regeneration period may be undesirable in some machine environments. In addition, the temperatures required for regeneration may be in excess of 500° C. At such temperatures, soot contained within the filter may spontaneously combust, resulting in damage to the filter and/or its components.

An alternative method of removing built-up pollutants from a filter may be to remove the clogged filter from the machine in which it is installed and direct a flow of gas through the filter in a reverse direction. Although effective, the filter may be large, heavy, and difficult to remove. This makes it cumbersome, time consuming, and dangerous to service the filter in this manner.

International Publication No. WO 2010/037406 ("the '406 publication") teaches a different method and system for regenerating a filter. In particular, the '406 publication discloses using at least one electric arc discharge to generate a pressure wave that dislodges particulate matter from the filter while the filter remains in place.

Although the '406 publication may teach a simpler way to regenerate a filter, the system described therein requires the use of a plurality of electrodes that are distributed within the filter media. These electrodes increase the overall cost and complexity of the system. In addition, because the electrodes are embedded within the filter media, the system may only be operable with filters designed specifically for operation with the system disclosed in the '406 publication.

The present disclosure is directed to overcoming one or more of the problems set forth above and/or other problems of the prior art.

SUMMARY

In one aspect, the present disclosure is related to a method for removing matter from a filter. The method may include measuring loading conditions of a filter media. Based on the loading conditions, the method may also include applying at least one voltage pulse between an electrode external to the filter media and a housing of the filter media to induce a plurality of shock waves directed toward the filter media.

In another aspect, the present disclosure is related to a regeneration system. The regeneration system may include a filter media configured to collect matter from an exhaust flow, and a conductive housing enclosing the filter media. The regeneration system may also include a diagnostic device that monitors loading conditions of the filter media. Additionally, the regeneration system may include an electrode disposed within the conductive housing separate from the filter media and electrically insulated from the conductive housing, and a pulse generator configured to apply a voltage pulse between the electrode and the conductive housing such that a plurality of shock waves are created within the conductive housing. The regeneration system also may include a regeneration controller in communication with the pulse generator and the diagnostic device, the regeneration controller being configured to activate the pulse generator based on the loading conditions.

DETAILED DESCRIPTION

Figure 1:
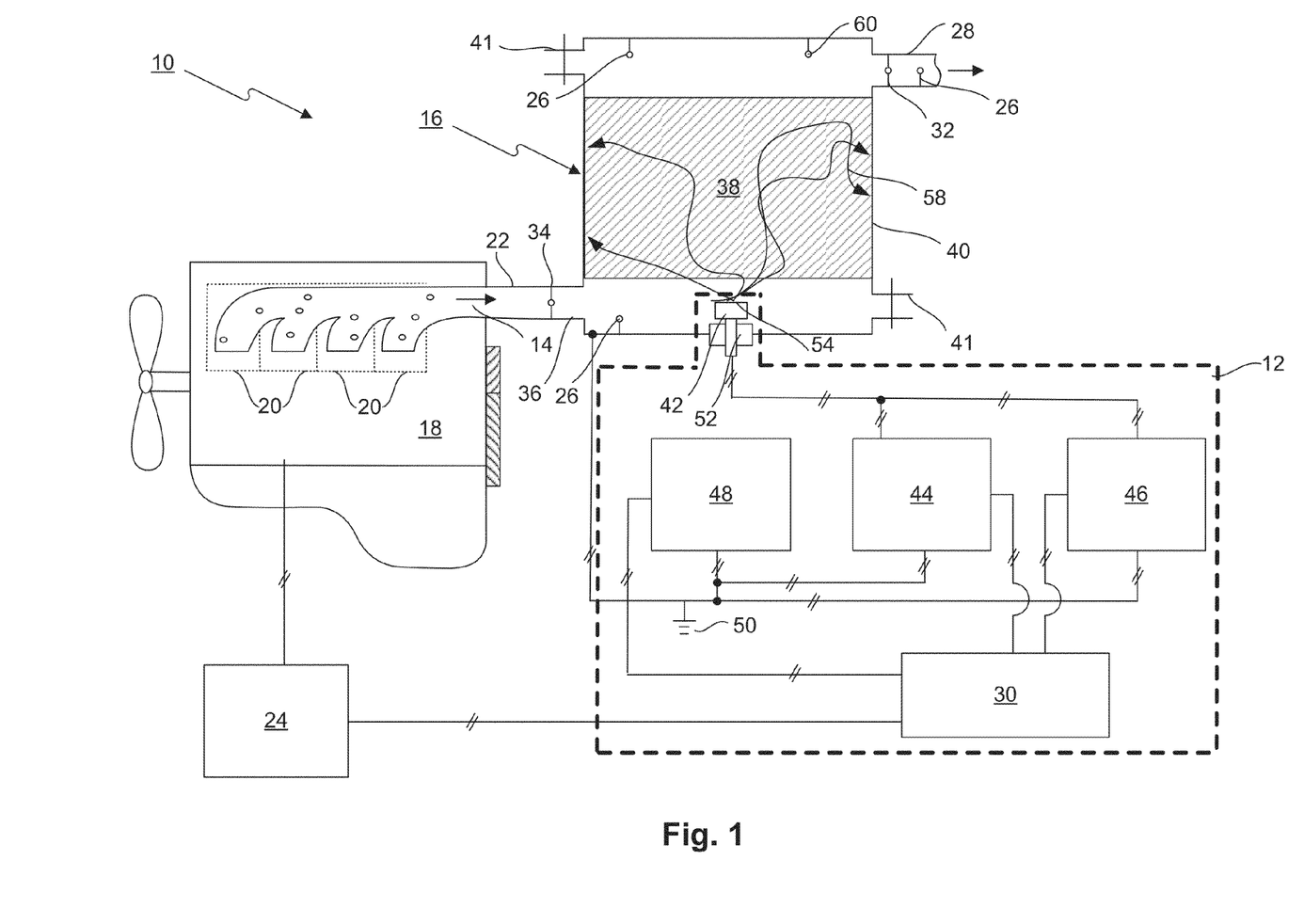
FIG. 1 is a diagrammatic illustration of exemplary disclosed mobile power and filter regeneration systems.

FIG. 1 illustrates an exemplary power system 10 incorporating a filter regeneration system 12 consistent with this disclosure. For the purposes of this disclosure, power system 10 is depicted and described as an internal combustion engine, for example a gasoline, diesel, or gaseous fuel-powered engine that produces a flow of exhaust gas 14 containing pollutants. Power system 10 may be part of a mobile system, for example, a long haul truck, a dozer, a motor grader, or a wheel loader. Additionally, in some embodiments power system 10 may be part of a stationary system (discussed below with reference to FIG. 2), for example, a furnace, generator set, a pumping station, etc. The pollutants are composed of gaseous and solid material, including particulate matter and sulfur compounds. Power system 10 contains a particulate filter 16 ("filter 16") to remove some or all of the pollutants from exhaust gas 14. However, it is contemplated that power system 10 may embody any other type of gas producing, treating, and/or handling system known in the art where a filter is used to remove pollutants (e.g., particulate matter) from an exhaust gas.

Power system 10, as an internal combustion engine, may include an engine block 18 that at least partially defines a plurality of cylinders 20, and a plurality of piston assemblies (not shown) disposed within cylinders 20. Cylinders 20, together with the pistons, may form a plurality of combustion chambers. It is contemplated that power system 10 may include any number of combustion chambers and that the combustion chambers may be disposed in an "in-line" configuration, a "V" configuration, or in any other conventional configuration. An exhaust passage 22 may extend from the combustion chambers to the atmosphere, and filter 16 along with one or more different treatment devices (e.g., reductant injectors, catalysts, attenuation devices, etc.) may be disposed within exhaust passage 22.

In some embodiments, power system 10 may be equipped with an engine controller 24. In these embodiments, engine controller 24 may be configured to regulate operations of power system 10, for example fuel injection, boosting, gas mixing, valve timing, exhaust gas recirculation, reductant dosing, filter regeneration, and other operations, to affect production of particulate matter and/or its discharge to the atmosphere.

In some embodiments, one or more diagnostic devices 26 may be disposed proximate an outlet 28 of filter 16. Diagnostic devices 26 may be, for example, part of power system 10 or a device to which filter 16 is connected and may be external to filter 16. Alternatively, diagnostic devices 26 may be internal to filter 16. Diagnostic devices 26 may be any sensing devices known in the art such as, for example, flow meters, emission meters, pressure transducers, or other sensors. Such diagnostic devices 26 may sense, for example, loading conditions of filter 16. At least one diagnostic device 26 may be positioned upstream of filter media 38 and at least one diagnostic device 26 may be positioned downstream of filter media 38. In this configuration, diagnostic devices 26 may monitor a pressure drop across filter media 38. The pressure drop may be indicative of filter media loading (e.g., percent saturation of filter 16). Additionally, diagnostic devices 26 may send pollutant level information to engine controller 24, to a regeneration controller 30, to other devices (not shown), or some combination thereof, and may assist in, for example, triggering filter regeneration and/or filter servicing. It is understood that, as used herein, the term "regeneration" means dislodging of soot and ash from within filter 16, or a combination of dislodging and oxidation techniques which elevate temperatures within filter 16.

An outlet valve 32 may be disposed proximate outlet 28 of filter 16 and an inlet valve 34 may be disposed proximate an inlet 36 of filter 16. Outlet valve 32 and inlet valve 34 may be the same type of valve or may be different types of valves, depending on requirements of the application. Outlet and inlet valves 32, 34 may be, for example, poppet valves, butterfly valves, or any other type of controllable valves known in the art. Outlet and inlet valves 32, 34 may be controlled to allow any range of exhaust flow to pass from engine block 18 to filter 16 and out of filter 16. Outlet and inlet valves 32, 34 may be positioned to completely restrict an exhaust flow of engine block 18 or may allow the flow to pass unrestricted. Outlet and inlet valves 32, 34 may be connected to filter 16 by any conventional means known in the art.

Filter 16 may be any type of filter known in the art, such as, for example, a foam cordierite, sintered metal, or silicon carbide type filter. Filter 16 may include filter media 38. Filter media 38 may be any material useful in removing pollutants from an exhaust flow. In some embodiments of the present disclosure, filter media 38 may contain catalyst materials capable of collecting, for example, soot, particulate matter, and/or other pollutants known in the art. Such catalyst materials may include, for example, alumina, platinum, rhodium, barium, cerium, alkali metals, alkaline-earth metals, rare-earth metals, or combinations thereof. Filter media 38 may be situated horizontally, vertically, radially, or helically. Filter media 38 may also include a plurality of channels arranged in a honeycomb, mesh, or any other configuration so as to maximize a surface area available for the filtering of pollutants. Additionally, filter 16 may include a filter housing 40 made of a conductive material, such as for example, stainless steel, steel, iron, etc. Filter housing 40 may include one or more access points 41 that allow for removal of matter dislodged from filter media 38 (discussed below with reference to FIG. 2). Access points 41 may be in locations conducive to removal of soot, ash, or other particulate matter from the filter (e.g., at a low point where loose matter may collect). Additionally, in some embodiments, matter may be removed from filter 16 via outlet 28, inlet 36, or some combination thereof.

Filter regeneration system 12 may include components that cooperate to regenerate filter 16. Filter regeneration system 12 may include, among other things, an electrode 42, a pulse generator 44, a voltage measurement device 46, a current measurement device 48, and regeneration controller 30. Electrode 42 may be positioned in fluid communication with exhaust gas 14 within filter 16 such that a discharge path between electrode 42 and filter housing 40 may be created within filter 16. Electrode 42 may be positioned on either side of filter 16. Pulse generator 44, voltage measurement device 46, current measurement device 48, and regeneration controller 30 may be located anywhere onboard of or in the immediate proximity to power system 10, and be in communication with each other, with electrode 42, and/or with engine controller 24.

Electrode 42 may embody a conductive element, for example an element composed of carbon nanotubes, carbon fibers, stainless or non-stainless steel, tantalum, platinum, tungsten, silver, gold, high-nickel alloys, copper, or other conductive elements. During normal operation (e.g., when filter housing 40 is connected to a ground 50 and a negative voltage is applied between electrode 42 and filter housing 40), electrode 42 may be insulated from ground 50 via an insulator 52. Insulator 52 may include, for example, a material fabricated from aluminum oxide, aluminum nitride, porcelain, boron nitride, or other insulating elements. While a negative voltage pulse generally produces a larger number of electrons than a positive voltage pulse, in other operations, a positive voltage pulse may be alternatively applied between electrode 42 and filter housing 40.

Electrode 42 may have a disk configuration. In this configuration, electrode 42 has a disk shaped component, with an upper electrode surface 54. Upper electrode surface 54 may be composed of a plurality of carbon fibers 56. Carbon fibers 56 in this embodiment are approximately 5 to 15 μm in diameter and can be hundreds of microns long. The relatively small diameter of the carbon fibers 56 may result in high enhancement of the applied electric field, which assists in plasma generation. The disk shape of electrode 42 may be beneficial in minimizing space requirements for electrode 42 within filter housing 40. It should be noted, however, that many other electrode configurations are also possible. For example, instead of a disk shape, electrode 42 may be shaped spherically, come to a point, have multiple points, etc.

The configuration of pulse generator 44 may be based on a capacitive architecture, an inductive architecture, or a combination thereof. A capacitive-based architecture may include one or more capacitors disposed in series (e.g., a capacitor bank) or in parallel (e.g., a Marx bank). An inductive-based architecture may include one or more magnetic inductors such as an induction coil, also known as an inductive adder. A combination capacitive-inductive architecture may include both inductive and capacitive components coupled to function together through the use of magnetic compression. Additionally, in some embodiments, pulse generator 44 may use one or more transmission lines (e.g., a Blumlien), if desired. Pulse generator 44 may be a stand-alone component or, alternatively, form an integral part of regeneration controller 30, as desired.

Pulse generator 44 may include or be connected to a source of electrical power (not shown). In one example, pulse generator 44 may include an integral energy storage device that functions as the source of electrical power. In another example, the energy storage device may be a separate unit, for example, a bank of one or more capacitors, a bank of one or more inductors, or a combination thereof. The energy storage device, in these embodiments, may be charged by a separate supply voltage (e.g., the voltage from an power system battery, a rectified utility voltage, etc.).

Pulse generator 44 may be controlled to generate and apply one or more negative voltage pulses to electrode 42 to cause a discharge between electrode 42 and filter housing 40 that creates a non-thermal plasma 58 in filter 16. In some embodiments, pulse generator 44 may be capable of producing a continuous train of discrete pulses. However, it is contemplated that pulse generator 44 may additionally or alternatively be configured to create one or more positive voltage pulses, as desired.

The output of pulse generator 44 may be adjusted to help generate a pulsed non-thermal plasma between electrode 42 and filter housing 40 during discharge. In particular, one or more of a width, an amplitude, and a frequency of the pulse created by pulse generator 44 may be selectively adjusted by regeneration controller 30 to thereby control characteristics of resulting non-thermal plasma 58. For example, the pulse width may be varied within a range of about 1-10 μs, pulse amplitude may be varied within a range of about 10-80 kV. Similarly, the pulse frequency may range from a single pulse to frequencies in the kHz. The voltage pulse rise time is preferably less than 10 ns. Additionally, in some embodiments, pulse generator 44 may dynamically adjust the rise time of the voltage pulse. Moreover, the creation of non-thermal plasma (as opposed to a thermal plasma, e.g., arc) between electrode 42 and filter housing 40 may help to reduce electrode erosion and energy supply requirements of filter regeneration system 12, and may provide longer plasma channels than other forms of electrical discharge.

Voltage measurement device 46 may embody a voltage divider, for example a resistive or capacitive voltage divider, that is configured to measure an actual voltage between electrode 42 and ground 50. Voltage measurement device 46 may be configured to generate a voltage signal indicative of the actual voltage and direct the voltage signal to regeneration controller 30 for further processing. It is contemplated that voltage measurement device 46 may additionally be configured to provide the voltage signal to another system or device, for example, to engine controller 24, to an oscilloscope, to an offboard computer, etc., if desired.

Current measurement device 48 may embody a current transformer configured to measure an actual current between electrode 42 and ground 50 during discharge. Current measurement device 48 may be further configured to generate a current signal indicative of the actual current and direct the current signal to regeneration controller 30 for further processing. It is contemplated that current measurement device 48 may additionally be configured to provide the current signal to another system or device, for example, to engine controller 24, to an oscilloscope, to an offboard computer, etc., as desired.

Regeneration controller 30 may include a processor (not shown), a memory (not shown), and/or a data interface (not shown). The processor(s) may be a single or multiple microprocessors, field programmable gate arrays (FPGAs), or digital signal processors (DSPs) capable of executing particular sets of instructions. The instructions executed by the processor may be pre-loaded into the processor or may be stored in separate computer-readable memory (not shown) or other separate storage device (not shown), such as a random access memory (RAM), a read-only memory (ROM), a hard disk, an optical disk, a magnetic medium, a flash memory, other permanent memory, other volatile memory, or any other tangible mechanism capable of providing instructions to the processor. Additionally, one or more lookup tables (not shown) may be stored in the processor and/or separate computer-readable memory, as desired, and referenced by the processor during execution of the instructions.

It should be appreciated that regeneration controller 30 could be dedicated to only filter regeneration functions or, alternatively, integral with engine controller 24 and be capable of controlling numerous power system functions and modes of operation. If separate from engine controller 24, regeneration controller 30 may communicate with engine controller 24 via data links or other methods. Various other known circuits may be associated with regeneration controller 30, including power supply circuitry, signal-conditioning circuitry, actuator driver circuitry (i.e., circuitry powering solenoids, motors, or piezo actuators), communication circuitry, and other appropriate circuitry. In some embodiments, regeneration controller 30 may be coupled to input/output devices (e.g., to a monitor, a keyboard, a printer, etc.) to receive input from a user and output information to the user. Regeneration controller 30 may be configured to communicate with other systems and/or devices, for example, an oscilloscope, a computer, etc., as desired. Additionally, in some embodiments, regeneration controller 30 may be configured to send control signals or otherwise communicate with one or all of pulse generator 44, voltage measurement device 46, current measurement device 48, electrode 42, one or more diagnostic devices 26, and one or more shock wave sensors 60 (e.g., as discussed below).

The lookup table used by regeneration controller 30 may contain information helpful in determining whether to begin a regeneration process for filter 16. For example, the lookup table may include threshold pollutant level information for soot or other pollutants leaving filter 16 under various engine operating conditions and associated filter loading conditions. Additionally, in some embodiments, the lookup table may contain pressure data associated with loading conditions of filter media 38. Measured values of the pollutant levels, pressure data, or some combination thereof, may then be referenced by regeneration controller 30 with the lookup table to determine if filter regeneration should begin. An example of this operation will be provided in the following section of this disclosure.

Additionally, the lookup table may include voltage pulse parameters required to create non-thermal plasma 58, such that non-thermal plasma 58 induces a plurality of shock waves. Specifically, each voltage pulse that creates non-thermal plasma 58 has an associated set of induced shock waves. A shock wave is a supersonic pressure wave induced by plasma discharge. The high energy electrons within non-thermal plasma 58 are accelerated at a high energy toward electrode 42 causing a sudden increase of air pressure in and around non-thermal plasma 58. The sudden increase in pressure produces rapid expansion of the air surrounding and within non-thermal plasma 58. Non-thermal plasma 58 may include a plurality of discharge channels (e.g., streamers), and in turn, the expansion of air proximate to each of the discharge channels may create a plurality of supersonic shock waves.

The voltage pulse parameters include voltage pulse rise time, voltage pulse amplitude, voltage pulse width, and voltage pulse frequency. The rise time of the voltage pulse correlates with the frequency of the one or more shock waves, such that a shorter rise time increases the frequency spectrum of the shockwaves. The voltage pulse parameters are such that non-thermal plasma 58 may create a plurality of shock waves that have a frequency spectrum of 10-20 GHz. It is also contemplated that voltage pulse parameters of the applied voltage pulses are selected such that the shock waves' wavelength spectrum may be on the order of the channel diameter in filter media 38. The wavelength spectrum corresponds to the associated frequency spectrum divided by the propagation speed of the shock waves. In some embodiments, the lookup table may include voltage and current pulse parameters over a range of operating configurations and conditions (e.g., gas pressure, gas temperature, pollutant levels, filter media channel diameter, and electrode configuration). The lookup table may store these different voltage parameters, along with the corresponding conditions and the expected shock wave frequency spectrum.

One or more shock wave sensors 60 may be associated with regeneration controller 30 to monitor shock wave generation within filter 16. For example, shock wave sensors 60 may include pressure sensors that measure rapid changes in pressure due to shock waves. Shock wave sensors 60 may be disposed within filter 16 at locations on either side of filter media 38, and may be configured to generate corresponding signals directed to regeneration controller 30. In some embodiments, regeneration controller 30 may be configured to determine the shock wave frequency spectrum based on the signals, and affect use of the lookup tables accordingly. It is contemplated that the shock wave frequency spectrum may alternatively be calculated from a temperature sensor (not shown) with a fast response time, instead of being directly measured, if desired. It is further considered that other parameters, for example a humidity of the exhaust gas 14, may alternatively be sensed and utilized to affect use of the lookup tables, if desired.

Regeneration controller 30 may regulate operation of pulse generator 44 to selectively generate a voltage pulse having particular characteristics. In particular, regeneration controller 30 may be configured to dynamically adjust a voltage, a width, and/or a frequency of the pulse generated by pulse generator 44. Alternatively, regeneration controller 30 may be configured to simply trigger pulse generator 44 to generate one or more pre-determined voltage pulses. In some embodiments, regeneration controller 30 may reference the lookup table to determine what voltage parameters are associated with a desired shock wave frequency. In operation, if the desired shock wave frequency does not occur, regeneration controller 30 may dynamically adjust the voltage pulse parameters to generate the desired shock wave frequency (e.g., increase voltage pulse rise time to increase shock wave frequency).

Regeneration controller 30 may take specific corrective actions in response to detection of loading conditions of filter media 38 that exceed threshold levels. The corrective actions may include, for example, beginning one or more regeneration cycles, entering a continuous regeneration mode of operation (e.g., this may occur if power system 10 is generating a particularly high level of pollutants), making adjustments to the operation of power system 10 via engine controller 24, or instructing a filter servicing system 62 (discussed below with reference to FIG. 2) to automatically remove ash and soot from filter 16. In some embodiments, regeneration controller 30 may be configured to determine that filter 16 should be replaced, and communicate this recommendation to a user of regeneration system 12 or power system 10.

Dislodged particulate matter may be removed from filter 16 via access points 41. Additionally, in some embodiments, matter may be removed from filter 16 via outlet 28, inlet 36, or some combination thereof. Access points 41 may include an access door to allow manual removal of filter media 38, access to filter media 38 within filter housing 40, internal access to filter 16, or some combination thereof, so that dislodged particulate matter may be removed from filter media 38 and filter housing 40. Particulate matter can be removed by blowing it away with compressed air, by vacuum, or in other ways. In some embodiments, one or both of outlet and inlet valves 32, 34 may be open while removing the particulate matter. In some embodiments, removal may be accomplished automatically during travel, or automatically or manually, when stopped at a service center. Additionally, removal of particulate matter can be done periodically or when triggered by regeneration controller 30 or engine controller 24.

Figure 2:
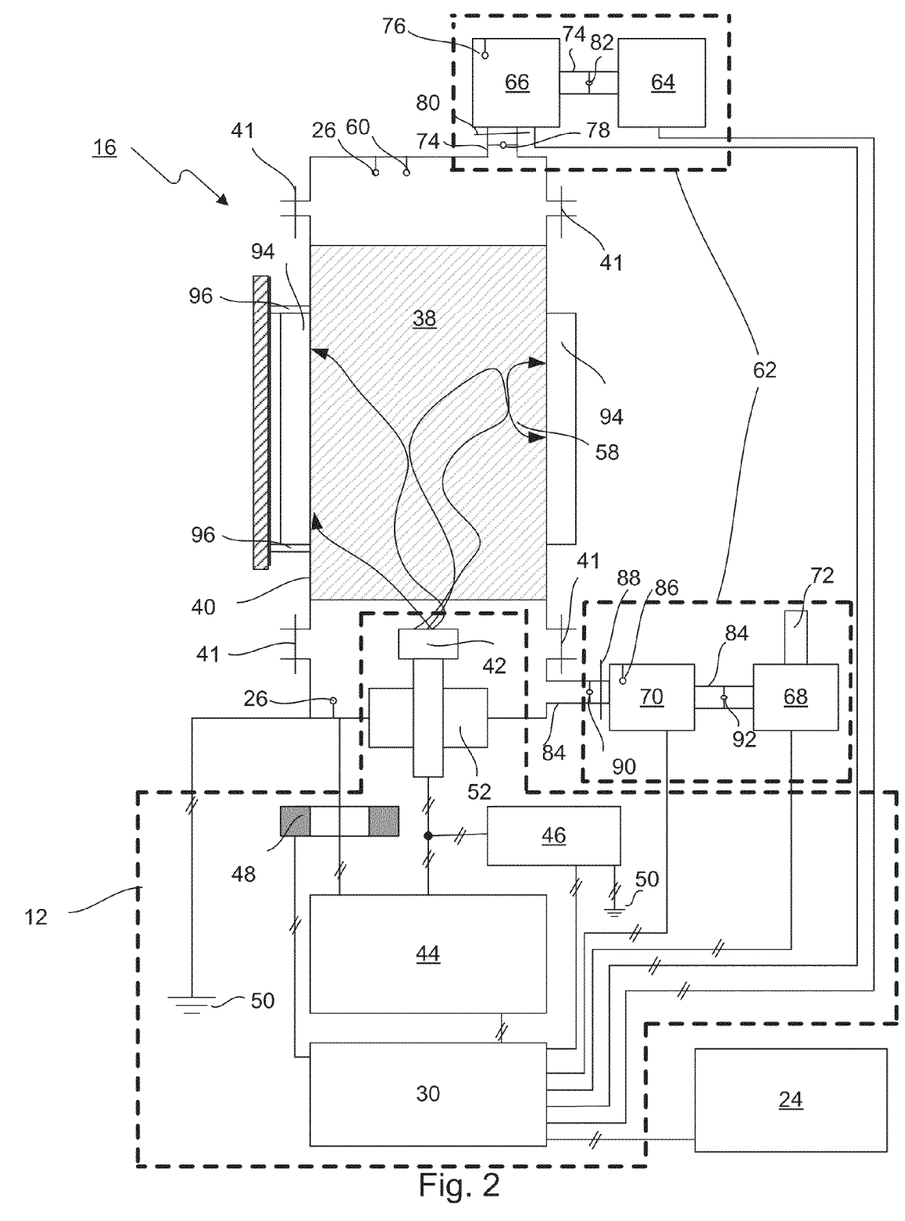
FIG. 2 is a diagrammatic illustration of an exemplary disclosed stationary filter regeneration system.

FIG. 2, illustrates a stationary embodiment of filter regeneration system 12 and filter servicing system 62. Filter servicing system 62 may include components that cooperate to service filter 16 at, for example, a stationary service center. Filter servicing system 62 may include, among other things, a gas source 64, a gas storage device 66, a vacuum source 68, a vacuum storage device 70, and a receptacle 72. Filter servicing system 62 may be in communication with and controlled by regeneration controller 30, engine controller 24, or some combination thereof.

A gas line 74 may connect various components of filter servicing system 62 to allow pressurized gas to pass from gas source 64 into filter 16. Gas line 74 may be any type of tubing, piping, or hose known in the art. Gas line 74 may be, for example, plastic, rubber, aluminum, copper, steel, or any other material capable of delivering a compressed gas in a controlled manner, and may be flexible or rigid. The length of the gas line 74 may be minimized to facilitate operation of filter service system 62, while reducing the pressure drop between the gas source 64 and filter 16.

Gas source 64 may include, for example, an air compressor or any other device capable of compressing a gas and delivering the compressed gas through gas line 74. In one exemplary embodiment of the present disclosure, gas source 64 may be a shop air compressor of a type known in the art and may supply compressed air, or any other gas, at approximately 70 to 110 psi. This range may be increased or decreased depending on the size of gas source 64 used. Gas source 64 may deliver a gas in either a pulsed flow, a uniform flow, or some combination thereof. The gas may be any gas known in the art useful in removing ash or other matter from filter 16, such as, for example, air, oxygen, hydrogen, nitrogen, or helium. It is understood that the gas may be capable of being compressed and delivered through gas line 74.

Gas storage device 66 may be located downstream of gas source 64 and an outlet of gas source 64 may be fluidly connected to an inlet of gas storage device 64 by gas line 74. Gas storage device 66 may be any device capable of storing a pressurized gas. Gas storage device 66 may include, for example, a high pressure gas tank or an expandable storage container. In embodiments where gas storage device 66 contains a pressurized gas before being fluidly connected to filter servicing system 62 of the present disclosure, gas source 64 may be omitted. Gas storage device 66 may be made of any material known in the art and may be rigid or flexible. Such materials may include, for example, steel, cast iron, copper, aluminum, titanium, and/or any alloys or combinations thereof. In addition, gas storage device 66 may also be made from plastic, rubber, vinyl, polytetrafloroethylene, expanded polytetrafloroethylene, or some derivative or combination thereof. In yet another alternative, gas storage device 66 may be made from a combination of any of the metals and/or nonmetals described above.

Gas storage device 66 may have any capacity useful in supplying a controlled volume of high pressure gas to a device, such as, for example, a filter. Gas storage device 66 may be capable of storing gas at any desirable pressure relative to atmosphere. For example, in one embodiment of the present disclosure, gas storage device 66 may be capable of storing pressurized gas in a range that may be safe for servicing filters containing, for example, cordierite plugs. Such plugs and other like filter media 38 may not be capable of withstanding a pressure of greater than approximately 150 psi without sustaining damage.

Gas storage device 66 may include at least one gas storage device sensor 76 capable of sensing, for example, flow, pressure, temperature, or other flow metrics known in the art. The couplings or other means used to fluidly connect gas storage device 66 to, for example, gas line 74 may be sized and otherwise designed to form a sealed connection regardless of the gas pressure within gas storage device 66. The housing wall thickness of gas storage device 66 may also be appropriate for such pressures. In addition, gas storage device 66 may be advantageously shaped to store and controllably release a desired volume of pressurized gas. For example, gas storage device 66 may be cylindrical or spherical to maximize structural integrity.

A gas storage device valve 78 may be disposed proximate a gas storage device outlet 80. Gas storage device valve 78 may be, for example, a poppet valve, butterfly valve, controllable membrane, or any other type of controllable flow regulation device known in the art. For example, gas storage device valve 78 may be controlled to allow any range of gas to pass from gas source 64 through gas line 74 to filter 16. Gas storage device valve 78 may be positioned to completely restrict a flow of gas from gas source 64 or may allow the flow to pass unrestricted. Gas storage device valve 78 may be connected to gas storage device 66 by any conventional means known in the art. In some embodiments, gas storage device valve 78 may be controlled to fully open and/or fully close at relatively high speeds. This high speed movement may be facilitated by a high speed control mechanism (not shown) controlled by regeneration controller 30, engine controller 24, or some combination thereof. The high speed control mechanism may include, for example, an electric, piezoelectric, pneumatic, hydraulic, or other controller. In some embodiments, the high speed control mechanism may be a solenoid, servo motor, or other conventional means.

Gas storage device 66 may also include a gas check valve 82 disposed proximate the inlet of gas storage device 66. Gas check valve 82 may be configured to permit compressed gas to flow into gas storage device 66 from gas source 64 and to prohibit gas from exiting through the inlet of gas storage device 66. Gas check valve 82 may, thus, assist in the storage of pressurized gas within gas storage device 66.

It is understood that in further embodiments of the present disclosure, various other flow paths may be used to direct a flow from gas source 64 to filter 16. For example, in some embodiments, gas storage device 66 may include a three-way valve (not shown) or other type of valve capable of enabling a user to bypass gas storage device 66 and to direct a flow of compressed gas from gas source 64 directly to filter 16. In other exemplary embodiments, gas storage device 66 may be omitted.

Vacuum source 68 of filter servicing system 62 may be connected to components of filter servicing system 62, such as, for example, vacuum storage device 70 and filter 16 by vacuum line 84. In this embodiment, vacuum line 84 couples to filter 16 on a side of filter media 38 that is opposite the side of filter media 38 where gas line 74 couples to filter 16. Vacuum source 68 may also include receptacle 72.

Vacuum source 68 may include, for example, a shop vacuum, a vacuum pump, or any other device capable of creating negative pressure within another device. Vacuum source 68 may be of any power or capacity useful in cleaning filter 16, and its size may be limited by the size and/or type of filter 16 being cleaned. For example, a filter including cordierite plugs may not be capable of withstanding a negative pressure of greater than approximately 150 psi without sustaining damage to the plugs and/or other filter media 38. Thus, vacuum source 68 used to clean such a filter may have a maximum capacity that is less than approximately 150 psi. In some embodiments of the present disclosure, vacuum source 68 may supply a constant vacuum to, and thereby create a constant negative pressure within filter 16. In other embodiments, vacuum source 68 may supply a pulsed or varying vacuum to filter 16. The consistency of the vacuum supplied to filter 16 may vary with each application and may depend on the structure, design, type, and/or other characteristics of filter 16.

Receptacle 72 may be fluidly connected to vacuum source 68. Receptacle 72 may be configured to collect matter removed from filter 16 and may be removably attached to vacuum source 68. For example, in some embodiments, as vacuum source 68 draws matter from filter 16, the removed matter may pass through a vacuum filter internal to the vacuum source (not shown). In such embodiments, receptacle 72 may collect and store the matter collected by the vacuum filter. Receptacle 72 may be any size useful in collecting the matter removed from filter 16 and may have any useful capacity and shape. For example, receptacle 72 may be cylindrical or box-shaped, and may be a rigid container or a flexible bag. Receptacle 72 may be designed to collect and store matter of any type or composition. In one embodiment of the present disclosure, receptacle 72 may be designed to store harmful pollutants, such as, for example, ash, and may be made of, for example, steel, tin, reinforced cloth, aluminum, composites, ceramics, or any other material known in the art. Receptacle 72 may be rapidly disconnected and reconnected to vacuum source 72 to facilitate disposal of the matter collected therein.

Filter servicing system 62 may further include a vacuum storage device 70. Vacuum storage device 70 may be located downstream of the inlet of vacuum source 68 and vacuum source 68 may be fluidly connected to vacuum storage device 70 by vacuum line 84. Vacuum storage device 70 may be any device capable of storing a gas at a negative pressure. The housing wall thickness of vacuum storage device 70 may be appropriate for such negative pressures. Vacuum storage device 70 may include, for example, a high pressure gas tank and may be made of any material known in the art. Vacuum storage device 70 may have mechanical characteristics similar to gas storage device 68 and, in some embodiments, vacuum storage device 70 may be the same as gas storage device 68. In embodiments where vacuum storage device 70 contains a gas at a negative pressure before being fluidly connected to filter servicing system 62 of the present disclosure, vacuum source 68 may be omitted. Vacuum storage device 70 may include at least one vacuum storage device sensor 86 capable of sensing, for example, flow, pressure, temperature, or other flow metrics known in the art.

A vacuum storage device inlet 88 may be fluidly connected to an outlet of filter 16 by vacuum line 84, and a vacuum storage device valve 90 may be disposed proximate vacuum storage device inlet 88. Vacuum storage device valve 90 may be, for example, a poppet valve, butterfly valve, a controllable membrane, or any other type of controllable flow regulation device known in the art. For example, vacuum storage device valve 90 may be controlled to allow any range of gas to pass from filter 16 to vacuum storage device 70. Vacuum storage device valve 90 may be positioned to completely restrict a flow of gas from filter 16 or may allow the flow to pass unrestricted. Vacuum storage device valve 90 may be connected to vacuum storage device 70 by any conventional means known in the art. In some embodiments, vacuum storage device valve 90 may be controlled to fully open and/or fully close at relatively high speeds. This high speed movement may be facilitated by a high speed control mechanism (not shown) controlled by regeneration controller 30, engine controller 24, or some combination thereof.

The vacuum storage device 70 may further include a vacuum check valve 92 disposed proximate an outlet of vacuum storage device 70. The vacuum check valve 92 may be configured to permit gas to flow to vacuum source 68 from vacuum storage device 70, and to prohibit gas from entering vacuum storage device 70 from the outlet of vacuum storage device 70. Vacuum check valve 92 may, thus, assist in the storage of gas under a negative pressure within vacuum storage device 70.

Additionally, in some embodiments filter servicing system 62 may further include a vibration device 94 configured to act on filter 16. In such an embodiment, filter brackets 96 may be configured to secure filter 16 to the stationary surface while allowing at least a portion of filter 16 to vibrate in response to actuation by the vibration device. The vibration device 94 may be, for example, a mechanical, magnetic, hydraulic, acoustic, electric, pneumatic, or other device known in the art capable of rapidly actuating or vibrating an object to which it is attached or to which it is in close proximity. The vibration device 94 may be removably attachable to filter housing 40 through conventional means and may be configured to extend at least partially around the circumference or outer perimeter of filter housing 40. In another exemplary embodiment, vibration device 94 may comprise two or more separate components attached to filter 16. It is understood that vibration device 94 may be connected to filter 16 at locations where vibration may assist in removing matter from, for example, filter media 38. In an exemplary embodiment, vibration device 94 may be disposed on filter housing 38 so as to extend along substantially an entire length of filter media 38. In such an embodiment, vibration device 94 may be, for example, a gyroscopic gear device extending longitudinally along filter housing 38.

Vibration device 94 may be electrically connected to regeneration controller 30, engine controller 24, or some combination thereof. It is understood that vibration device 94 may also be manually controlled. Vibration device 94 may be capable of transmitting any frequency of vibration to filter 16 useful in removing matter from filter 16. It alternate embodiments, vibration device 94 may be omitted from filter servicing system 62.

As described above, filter brackets 96 may be configured to secure filter 16 to a stationary surface while allowing at least a portion of filter 16 to vibrate in response to actuation by vibration device 94. It is understood that these filter brackets 96 may at least partially dampen vibration transmitted by vibration device 94. Vibration device 94 and/or the filter brackets 96 may, however, be tuned or otherwise selected to reduce this dampening such that actuation by vibration device 94 may assist in removing matter from filter 16 while filter 16 is attached to the stationary surface. In an additional exemplary embodiment, filter brackets 96 may be desirably loosened to decrease dampening. Alternatively, vibration device 94 may be connected to filter 16 after filter 16 has been removed for servicing.

Industrial Applicability

The regeneration system of the present disclosure may be used in any application where it is desired to regenerate a filter. The regeneration system may monitor loading conditions of a filter media, and begin, continue, or cease a regeneration process based on the loading conditions. The loading conditions may be referenced with a calibrated lookup table to determine if saturation of the filter exceeds a maximum threshold. Regeneration system may then institute a regeneration process. The regeneration process may utilize non-thermal plasma-induced shock waves, having a frequency spectrum of 10-20 GHz, to dislodge soot and ash from the filter. It is also contemplated that shock waves with different frequency spectrums may be achieved by using voltage pulses with different rise times. After it is determined that the regeneration process is complete, a filter servicing system may be used to remove the loose ash, soot, and other particulates from the filter. Potential applications for the disclosed regeneration system include, among others, mobile and stationary diesel engine applications. Operation of regeneration system 12 will now be described in detail.

During operation of regeneration system 12 depicted in FIG. 1, regeneration controller 30 may monitor loading conditions of filter media 38. In one embodiment, loading conditions may be determined by measuring a pressure drop across filter media 38. The measured pressure drop may then be referenced by regeneration controller 30 with a calibrated lookup table to determine the loading conditions of filter media 38. Additionally, in some embodiments measured particulate matter levels may be referenced by regeneration controller 30 with the lookup table to determine the loading conditions of filter media 38. When the loading conditions exceed a maximum threshold, a regeneration process may begin. In some embodiments, regeneration controller 30 automatically sets the regeneration process to occur for a fixed period of time based on the loading conditions of filter media 38.

During the regeneration process, regeneration controller 30 may cause pulse generator 44 to generate and apply one or more voltage pulses to electrode 42, thereby creating non-thermal plasma 58 between electrode 42 and filter housing 40. The non-thermal plasma 58 may generate a plurality of shock waves, which dislodge soot and ash while propagating within filter 16, and reflecting off one or more surfaces within filter 16 and filter housing 40. The voltage pulse parameters of the applied one or more voltage pulses are selected such that the plasma-induced shock waves have a shock wave frequency spectrum of about 10-20 GHz. In some embodiments, regeneration controller 30 applies the one or more voltage pulses at a predetermined frequency and/or for a predetermined time. It is also contemplated that the voltage pulse parameters may be selected such that the plasma induced shock waves have frequency spectrums that have corresponding wavelengths on the order of a channel diameter in filter media 38.

In some embodiments, regeneration controller 30 may actively monitor the pollution levels (e.g., soot) during the regeneration process using diagnostic devices. Measured pollution levels may then be referenced against the lookup table to determine loading conditions of filter media 38. Additionally, in some embodiments, regeneration controller 30 may actively monitor the pressure drop across filter media 38 during the regeneration process using diagnostic devices 60. The measured pressure data may then be referenced against the lookup table to determine the loading conditions of filter media 38. In this embodiment, the regeneration process may occur until loading conditions of filter 38 are below a minimum threshold. It is contemplated that regeneration controller 30 may also begin a regeneration cycle based on manual activation by a user of regeneration system 12, if desired.

In some embodiments, regeneration controller 30 may actively monitor for shock waves using the shock wave sensors 60. Additionally, in some embodiments, regeneration controller 30 may actively monitor the frequency spectrum of the induced shock waves using the shock wave sensors 60. Accordingly, regeneration controller 30 may receive signals from the shock wave sensors 60 and reference the received signals against data in the lookup table stored in memory to determine if each pulse is creating the desired shock wave frequency spectrum. For example, if the measured frequency spectrum is low, regeneration controller 30 may instruct pulse generator 44 to increase the rise time of the applied voltage pulse. Likewise, if the measured shock wave frequency is too high, regeneration controller 30 may instruct pulse generator 44 to reduce the voltage pulse rise time. Additionally, if the frequency between sets of induced shock waves is low, regeneration controller 30 may decrease the period between applied voltage pulses. Conversely, if the frequency between sets of induced shock waves is too high, regeneration controller 30 may increase the period between applied voltage pulses.

During the regeneration process, regeneration controller 30 may also actively monitor the voltage and current pulse to ensure that non-thermal plasma 58 is being created. Regeneration controller 30 may compare the measured voltage and current pulse to determine whether a thermal discharge occurs (e.g. arc), and dynamically adjust the voltage pulse parameters until non-thermal plasma 58 is created.

In a mobile power system, once the regeneration process is complete, any loose particulate matter may need to be removed. In some mobile power systems, the removal of particulate matter may occur after each regeneration process. In other embodiments, the removal of particulate matter may occur periodically (e.g., after a set number of regeneration processes, when the time between regeneration cycles falls below a minimum threshold, etc.). When away from a service center, particulate matter can be removed via access points 41 by blowing it away with compressed air, by vacuum, or in other ways. Removal may be accomplished automatically while the mobile power system is in transit or manually when stopped at a service center. In some embodiments, when utilizing a service center, loose particulate matter may be removed from filter 16 via filter servicing system 62, as discussed below.

In a stationary power system, once the regeneration process is complete, regeneration controller 30 may communicate with one or more components of filter servicing system 62 to automatically remove any loose ash and soot that was dislodged from filter media 38. For example, regeneration controller 30 may activate vacuum source 68 to create a negative pressure within vacuum storage device 70. Regeneration controller 30 may then open vacuum storage device valve 90 to evacuate loose and dislodged particulate matter within filter 16 to receptacle 72.

Additionally, in some embodiments, regeneration controller 30 may activate gas source 64 to pressurize gas storage device 66. In this embodiment, when regeneration controller 30 opens vacuum storage device valve 90, regeneration controller 30 may also open gas storage device valve 78, thus creating a larger pressure differential that may shorten the time to evacuate particulate matter from filter 16 to the receptacle 72.

Additionally, in some embodiments, regeneration controller 30 may command vibration device 94 to vibrate filter 16 for a particular time and at a particular vibration frequency. As discussed above, regeneration controller 30 may then evacuate particulate matter from filter 16 to receptacle 72. It is also contemplated that manual evacuation of the particulate matter may occur via one or more access points 41.

Several advantages may be associated with filter regeneration system 12. For example, filter regeneration system 12 may be capable of use with a variety of filters, as electrode 42 is not part of the structure of filter media 38. The use of a single electrode where filter housing 40 acts as the second electrode keeps the design simple and inexpensive. Moreover, the plasma created between electrode 42 and filter housing 40, being a non-thermal plasma, may help to reduce potential electrode erosion. Additionally, the use of high frequency shock waves may improve the amount of ash and soot dislodged from filter media 38 at normal exhaust gas temperatures.

It will be apparent to those skilled in the art that various modifications and variations can be made to the methods of the present disclosure without departing from the scope of the disclosure. Other embodiments will be apparent to those skilled in the art from consideration of the specification and practice of the methods disclosed herein. It is intended that the specification and examples be considered as exemplary only, with a true scope of the disclosure being indicated by the following claims and their equivalents.

What is claimed is:

1. A method for removing matter from a filter, comprising:
   measuring loading conditions of a filter media;
   based on the loading conditions, applying a plurality of voltage pulses between an electrode external to the filter media and a housing of the filter media, the plurality of voltage pulses creating a non-thermal plasma to induce shock wave sets directed toward the filter media
   acquiring pressure data from within the filter;
   determining a frequency between shock wave sets based on the pressure data; and
   adjusting at least one of a frequency of the plurality of voltage pulses based on the frequency of shock wave sets.

2. The method of claim 1, wherein at least one of the plurality of voltage pulses is negative.

3. The method of claim 1, further including:
   making a determination based on the loading conditions that regeneration is complete; and
   cease applying the plurality of voltage pulses between the electrode and the filter housing based on the determination.

4. The method of claim 1, wherein applying the plurality of voltage pulses includes applying the plurality of voltage pulses for a fixed period of time.

5. The method of claim 1, further including activating a filter servicing system to evacuate particulate matter dislodged from the filter by the shock wave sets.

6. The method of claim 5, wherein activating the filter servicing system includes:
   creating a pressure differential across the filter media to blow dislodged material from the filter media; and
   collecting the dislodged material.

7. The method of claim 6, wherein activating the filter servicing system further includes vibrating the filter media to remove loose matter.

8. A regeneration system comprising:
   a filter media configured to collect matter from an exhaust flow;

a conductive housing enclosing the filter media;
a diagnostic device configured to monitor loading conditions of the filter media;
an electrode disposed within the conductive housing separate from the filter media and electrically insulated from the conductive housing;
a pulse generator configured to apply a plurality of voltage pulses between the electrode and the conductive housing such that a plurality of shock waves are created within the conductive housing;
a pressure sensor; and
a regeneration controller in communication with the pulse generator and the diagnostic device, and being configured to
activate the pulse generator based on the loading conditions
acquire data from the pressure sensor,
and adjust at least one of a frequency of the plurality of voltage pulses, and a rise time of the plurality of voltage pulses based on the data.

9. The system of claim 8, wherein at least one of the plurality of voltage pulses is negative.

10. The system of claim 8, wherein the electrode is a carbon fiber electrode that is disk shaped.

11. The system of claim 8, wherein the electrode is coupled to the conductive housing, such that the shock waves propagate through the filter media away from the electrode, reflect off the conductive housing, and propagate back through the filter media toward the electrode.

12. The system of claim 8, further including:
a vacuum storage device configured to create a negative pressure on a side of the filter media;
a gas storage device configured to discharge a pressurized gas at an opposite side of the filter media; and
a receptacle configured to collect particulate matter dislodged from the filter media, and
wherein the regeneration controller is configured to activate the vacuum storage device and the gas storage device when regeneration of the filter media is complete.

13. A power system, comprising:
an engine configured to generate a flow of exhaust gas;
a passage configured to direct the exhaust gas to the atmosphere;
a conductive housing disposed in fluid communication with the passage;
a filter media located within the conductive housing and configured to collect matter from the flow of exhaust gas;
a diagnostic device configured to monitor loading conditions of the filter media;
a disk-shaped electrode disposed within the conductive housing, and electrically insulated from the conductive housing, and located at one side of the filter media;
a pulse generator configured to apply a voltage pulse between the electrode and the conductive housing such that a plurality of shock waves are created within the conductive housing;
a service system configured to collect matter dislodged from the filter media by the plurality of shock waves;
a pressure sensor; and
a regeneration controller in communication the pulse generator, and the diagnostic device, and being configured to
activate the pulse generator and the service system based on the loading conditions
acquire data from the pressure sensor,
and adjust at least one of a frequency of the plurality of voltage pulses, and a rise time of the plurality of voltage pulses based on the data.

14. A method for removing matter from a filter, comprising:
measuring loading conditions of a filter media;
based on the loading conditions, applying a plurality of voltage pulses between an electrode external to the filter media and a housing of the filter media, the plurality of voltage pulses creating a non-thermal plasma to induce shock wave sets directed toward the filter media;
acquiring pressure data from within the filter;
determining a shock wave frequency spectrum for a first shock wave set based on the pressure data; and
adjusting a rise time of the plurality of voltage pulses based on the shock wave frequency spectrum.

15. The method of claim 14, wherein at least one of the plurality of voltage pulses is negative.

16. The method of claim 14, further including:
making a determination based on the loading conditions that regeneration is complete; and
cease applying the plurality of voltage pulses between the electrode and the filter housing based on the determination.

17. The method of claim 14, wherein applying the plurality of voltage pulses includes applying the plurality of voltage pulses for a fixed period of time.

18. The method of claim 14, further including activating a filter servicing system to evacuate particulate matter dislodged from the filter by the shock wave sets.

19. The method of claim 18, wherein activating the filter servicing system includes:
creating a pressure differential across the filter media to blow dislodged material from the filter media; and
collecting the dislodged material.

20. The method of claim 19, wherein activating the filter servicing system further includes vibrating the filter media to remove loose matter.

* * * * *

UNITED STATES PATENT AND TRADEMARK OFFICE
CERTIFICATE OF CORRECTION

PATENT NO. : 8,679,209 B2  
APPLICATION NO. : 13/330872  
DATED : March 25, 2014  
INVENTOR(S) : Sergey Korenev Page 1 of 1

It is certified that error appears in the above-identified patent and that said Letters Patent is hereby corrected as shown below:

In the Specification

Column 12, line 4, delete "Industrial Applicability" and insert -- INDUSTRIAL APPLICABILITY --.

Signed and Sealed this  
Fifteenth Day of September, 2015

Michelle K. Lee  
*Director of the United States Patent and Trademark Office*